United States Patent
Peng et al.

(10) Patent No.: US 12,397,630 B2
(45) Date of Patent: Aug. 26, 2025

(54) ELECTRIC DRIVE UNIT MAGNETOHYDRODYNAMIC COOLING

(71) Applicant: GM GLOBAL TECHNOLOGY OPERATIONS LLC, Detroit, MI (US)

(72) Inventors: Peng Peng, Columbus, OH (US); Farzad Samie, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 415 days.

(21) Appl. No.: 17/986,990

(22) Filed: Nov. 15, 2022

(65) Prior Publication Data

US 2024/0157779 A1    May 16, 2024

(51) Int. Cl.
| | |
|---|---|
| H01M 10/625 | (2014.01) |
| B60K 11/02 | (2006.01) |
| B60L 58/26 | (2019.01) |
| H01M 10/613 | (2014.01) |
| H01M 10/6567 | (2014.01) |

(52) U.S. Cl.
CPC .............. B60K 11/02 (2013.01); B60L 58/26 (2019.02); H01M 10/613 (2015.04); H01M 10/625 (2015.04); H01M 10/6567 (2015.04); H01M 2220/20 (2013.01)

(58) Field of Classification Search
CPC ...... H02K 44/085; H02K 44/06; H02K 44/04; H02K 44/00; H02K 44/02; H02K 44/08; H02K 44/16; H02K 44/12; H02K 44/10; H02K 9/197; H02K 9/193; H02K 9/19; H02K 1/20; H02K 1/14; H02K 1/32; H02K 1/148; H02K 7/1823; H02K 7/061; H02K 7/1876; H02K 7/14; H02K 7/00; H02K 47/02; H02K 41/03; H02K 41/025; H02K 5/203; H02K 5/00
See application file for complete search history.

(56) References Cited

U.S. PATENT DOCUMENTS

2018/0091012 A1 *  3/2018  Yang ............... H02K 9/193

FOREIGN PATENT DOCUMENTS

WO    WO-2022159172 A1 *  7/2022  ............. H01F 27/10

* cited by examiner

Primary Examiner — Bryan R Perez
(74) Attorney, Agent, or Firm — CANTOR COLBURN LLP

(57) ABSTRACT

An electrified vehicle may include an electric drive unit having a power inverter and a motor, a closed circulation path containing an electrically conductive working fluid in thermal communication with at least one of the power inverter and the motor, and a magnetohydrodynamic pump containing the working fluid and effective to circulate the working fluid through the closed circulation path.

20 Claims, 5 Drawing Sheets

ELECTRIC DRIVE UNIT MAGNETOHYDRODYNAMIC COOLING

INTRODUCTION

The subject disclosure relates to electrified vehicles (EV). More particularly, the subject disclosure relates to cooling in an EV.

EVs may include battery electric vehicles (BEV) or hybrid electric vehicles (HEV), each of which may include an electric traction motor providing or contributing propulsion torque to the powertrain and powered by a rechargeable energy storage system (RESS) through a traction power inverter module (TPIM). EV components and systems may generate substantial heat. A coolant fluid pumped through EV components may absorb heat from those components and dissipate the heat to the environment. A fluid pump may include a mechanical pump section driven by an electric motor or a mechanical coupling to an output of the electric traction motor.

SUMMARY

In one exemplary embodiment, an electrified vehicle may include an electric drive unit having a power inverter and a motor, a closed circulation path containing an electrically conductive working fluid in thermal communication with at least one of the power inverter and the motor, and a magnetohydrodynamic pump containing the working fluid and effective to circulate the working fluid through the closed circulation path.

In addition to one or more of the features described herein, the closed circulation path may include a heat dissipation device for dissipating heat from the working fluid.

In addition to one or more of the features described herein, the closed circulation path may include a cold plate in thermal communication with the power inverter.

In addition to one or more of the features described herein, the closed circulation path may include a cooling passage within a housing for the electric drive unit.

In addition to one or more of the features described herein, the closed circulation path may include a cooling jacket for the electric drive unit.

In addition to one or more of the features described herein, the magnetohydrodynamic pump may include an inductor providing a magnetic field through the working fluid.

In addition to one or more of the features described herein, the magnetohydrodynamic pump may include permanent magnets providing a magnetic field through the working fluid.

In addition to one or more of the features described herein, the electrified vehicle may further include a first DC power supply providing a first current through the working fluid within the magnetohydrodynamic pump and a second DC power supply providing a second current through a coil of the inductor.

In addition to one or more of the features described herein, the inductor may include a coil and an iron core.

In addition to one or more of the features described herein, the inductor may be in-line with a DC link to the power inverter.

In addition to one or more of the features described herein, the electrified vehicle may further include a DC power supply providing a common current through the working fluid within the magnetohydrodynamic pump and through a coil of the inductor.

In addition to one or more of the features described herein, the DC power source may include a high voltage DC bus coupled to the power inverter through a DC link.

In addition to one or more of the features described herein, the high voltage DC bus may be coupled to the power inverter through a DC link including a positive DC rail and the inductor may be in-line with the positive DC rail.

In addition to one or more of the features described herein, the working fluid may include one of a saline solution of water, a molten salt, a conductive nanofluid, and a liquid metal.

In another exemplary embodiment, an electrified vehicle may include an electric drive unit having a power inverter and a motor, the power inverter coupled to a DC power source through a DC link including an inductor in-line with the DC link, a closed circulation path including a cold plate in thermal communication with the power inverter and containing an electrically conductive working fluid in thermal communication with the power inverter and including a heat dissipation device for dissipating heat from the working fluid, and a magnetohydrodynamic pump containing the working fluid and effective to circulate the working fluid through the closed circulation path, wherein the DC link provides a current through the inductor, the inductor provides a magnetic field to the magnetohydrodynamic pump and the current through the inductor is provided through the electrically conductive working fluid at the magnetohydrodynamic pump.

In addition to one or more of the features described herein, the closed circulation path may further include cooling channels within a rotor structure of the motor.

In addition to one or more of the features described herein, the working fluid may include one of a saline solution of water, a molten salt, a conductive nanofluid, and a liquid metal.

In yet another exemplary embodiment, a cooling system for an electrified vehicle may include a power inverter coupled to a DC power source through a DC link including an inductor in-line with the DC link for providing a DC current to the power inverter, and a magnetohydrodynamic pump circulating an electrically conductive working fluid through a closed circulation path, wherein the inductor in-line with the DC link provides a magnetic field to the magnetohydrodynamic pump and stabilizes the DC current.

In addition to one or more of the features described herein, the DC link may provide a current through the electrically conductive working fluid at the magnetohydrodynamic pump.

In addition to one or more of the features described herein, the current through the electrically conductive working fluid may include a common current through the inductor in-line with the DC link.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
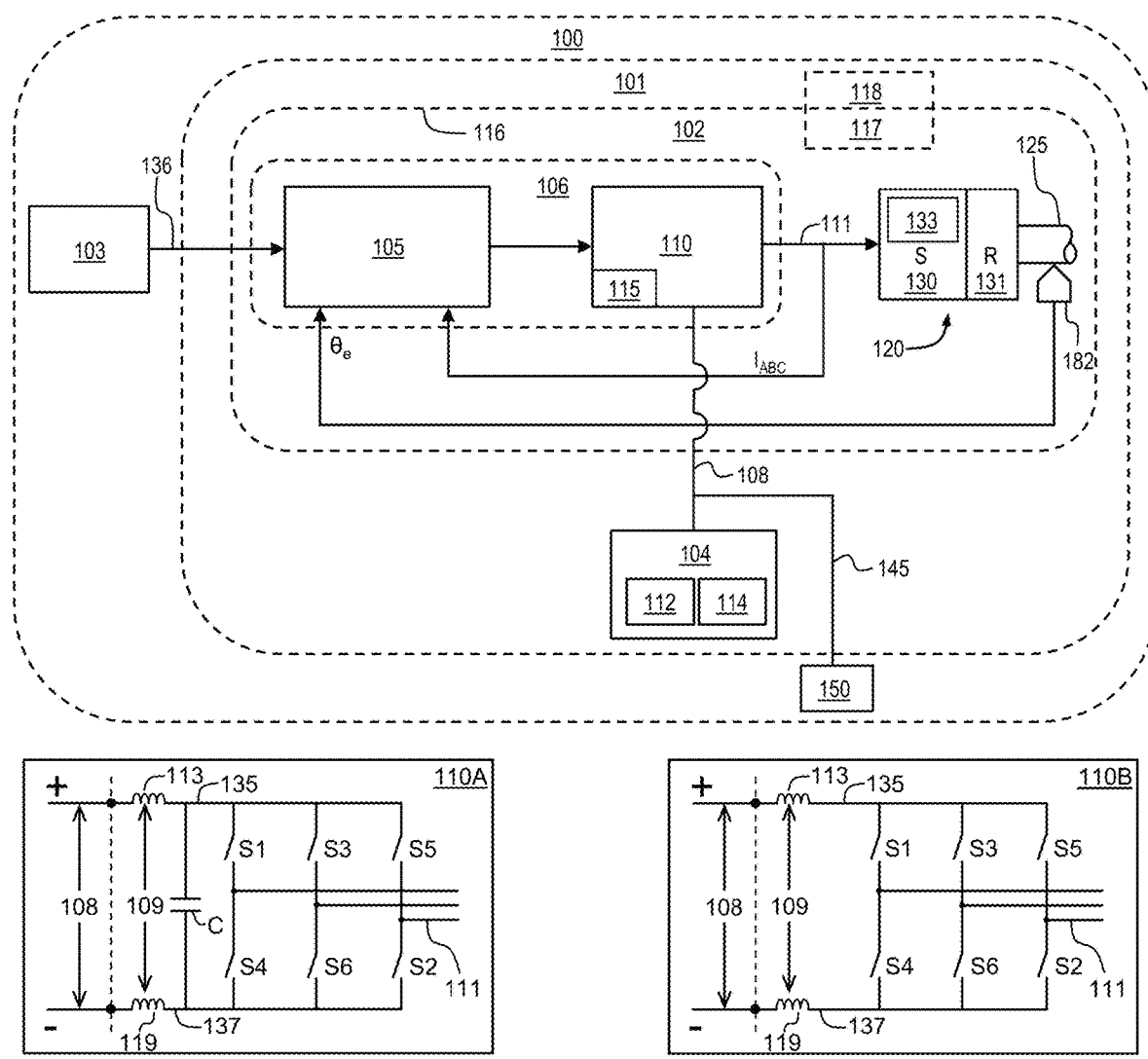
FIG. 1 illustrates an electric propulsion system in an electrified vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an exemplary electric propulsion system 101 on an electrified vehicle 100. Vehicle and vehicular are understood to refer to any means of transportation including non-limiting examples of motorcycles, cars, trucks, buses, excavation, earth moving, construction and farming equipment, railed vehicles like trains and trams, aircraft, and watercraft like ships and boats. The electric propulsion system 101 may include various control components and electrical and electro-mechanical systems including, for example, a rechargeable energy storage system (RESS) 104 and at least one electric drive unit (EDU) 102. The electric propulsion system 101 may be employed in a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry, integration and power capabilities. The EDU 102 may include, for example, an alternating current (AC) motor (motor) 120 and a traction power inverter module (TPIM) 106 including a motor controller 105 and a power inverter 110 contained within or integrated with an EDU housing 116. The motor 120 may include a stator 130 (S) including stator winding 133 and a rotor 131 (R) coupled to a rotor shaft 125 and a position sensor 182, for example a resolver or an encoder. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the power inverter 110 that controls the motor 120.

The rotor shaft 125 may transfer torque between the motor 120 and driveline components (not illustrated) at a drive end, for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105 of the TPIM 106 of EDU 102.

In an embodiment, the RESS 104 may include multiple electro-chemical battery packs 112, for example high capacity, high voltage (HV) rechargeable lithium ion battery packs for providing power to the vehicle via a HV direct current (DC) bus 108. An accessory bus 145 may couple to the HV DC bus 108 for providing electrical energy to high voltage accessory loads 150 such as an auxiliary power module (e.g., to step down higher voltages to lower voltages), an air conditioning electronic compressor and a battery pack heater. The RESS 104 may also include a battery manager module 114. The RESS 104 battery packs 112 may be constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the battery packs 112 and battery pack modules may be modular to the extent that their numbers and configurations may be varied to accommodate a desired energy density or range objective of a particular vehicle platform, intended use, or cost target and in accordance with propulsion and charging functions and propulsion system architecture. Selective reconfiguration of the battery packs 112 and the battery pack modules may be by way of controllable switches (e.g., contactors) for opening and closing various electrical paths effective to provide various parallel and series configurations of the battery packs 112 and the battery pack modules. For example, the RESS 104 may include a plurality of battery packs 112 each having a nominal voltage of, for example, 400 volts or 800 volts and being configured in parallel in respective 400 volt or 800 volt propulsion architectures during propulsion and during direct current fast charging (DCFC). The battery packs 112 may also be selectively coupled to the HV DC bus 108 and to charge ports by way of controllable switches. Some or all such controllable switches may be integrated into one or more controllable battery disconnect units (BDU) (not illustrated) or distributed variously within components or subsystems such as the RESS 104. It is understood that the RESS 104 may be reconfigurable at any level of integration including battery pack, battery module and cell levels.

The motor 120 may be a poly-phase AC motor receiving poly-phase AC power over a poly-phase motor control power bus (AC bus) 111 which is coupled to the power inverter 110. In one embodiment, the motor 120 is a three-phase motor and the power inverter 110 is a three-phase power inverter. As illustrated in additional detail in the insets of FIG. 1, the power inverter may be configured as a voltage source inverter (VSI) 110A or as a current source inverter (CSI) 110B. In any embodiment of the power inverter 110, including a VSI or CSI embodiment, the power inverter 110 may include a plurality of solid-state switches (S1-S6) based, for example, on IGBT and power MOSFET devices. One skilled in the art will recognize that VSI embodiments may be implemented using two-quadrant devices whereas CSI embodiments may be implemented using four-quadrant devices. In any power inverter embodiment, the power inverter 110 may couple to DC power provided by the HV DC bus 108 from the RESS 104. The HV DC bus may couple to the power inverter 110, the accessory bus 145 and to other high voltage loads including additional power inverters (not illustrated). As illustrated in the insets of FIG. 1, the power inverter 110 (VSI 110A or CSI 110B) may couple to the HV DC bus 108 via a DC link 109 including a positive DC rail 135 and a negative DC rail 137. In either the VSI 110A embodiment or the CSI 110B embodiment the DC link may include filtering including a DC link choke 113 in-line with the positive DC rail 135 for high frequency noise suppression and DC current stabilization. An additional DC link choke 119 may also be in-line with the negative DC rail 137. In a VSI 110A embodiment, filtering may include a DC link capacitor "C" across the positive DC rail 135 and the negative DC rail 137 for voltage stabilization. The motor controller 105 is coupled to the power inverter 110 for control thereof. The power inverter 110 electrically connects to stator phase windings of a polyphase stator winding of the motor 120 via the AC bus 111, with electric current monitored on two or three of the phase leads thereof. The power inverter 110 is configured with suitable control circuits including paired power transistors (e.g., IGBTs for transforming high-voltage DC electric power to high-voltage AC electric power and transforming high-voltage AC electric power to high-voltage DC electric power). The power inverter 110 may employ pulse width modulation (PWM) control to convert stored DC electric power originating in the battery pack 112 of the RESS 104 to AC electric power to drive the motor 120 to generate torque. Similarly, the power inverter 110 may convert mechanical power transferred to the motor 120 to DC electric power to generate electric energy that is storable in the battery packs 112 of the RESS 104, including as part of a regenerative control strategy. The power inverter 110 may be configured to receive motor control commands from motor controller 105 and control power inverter states to provide the motor drive and regeneration functionality.

Control of the power inverter 110 may include high frequency switching of the solid-state switches in accordance with a PWM control. A number of design and application considerations and limitations determine inverter switching frequency and PWM control. Inverter controls for AC motor applications may include fixed switching frequencies, for example switching frequencies around 10-20 kHz and PWM controls that minimize switching losses of the IGBTs or other power switches of the power inverter 110.

Figure 2:
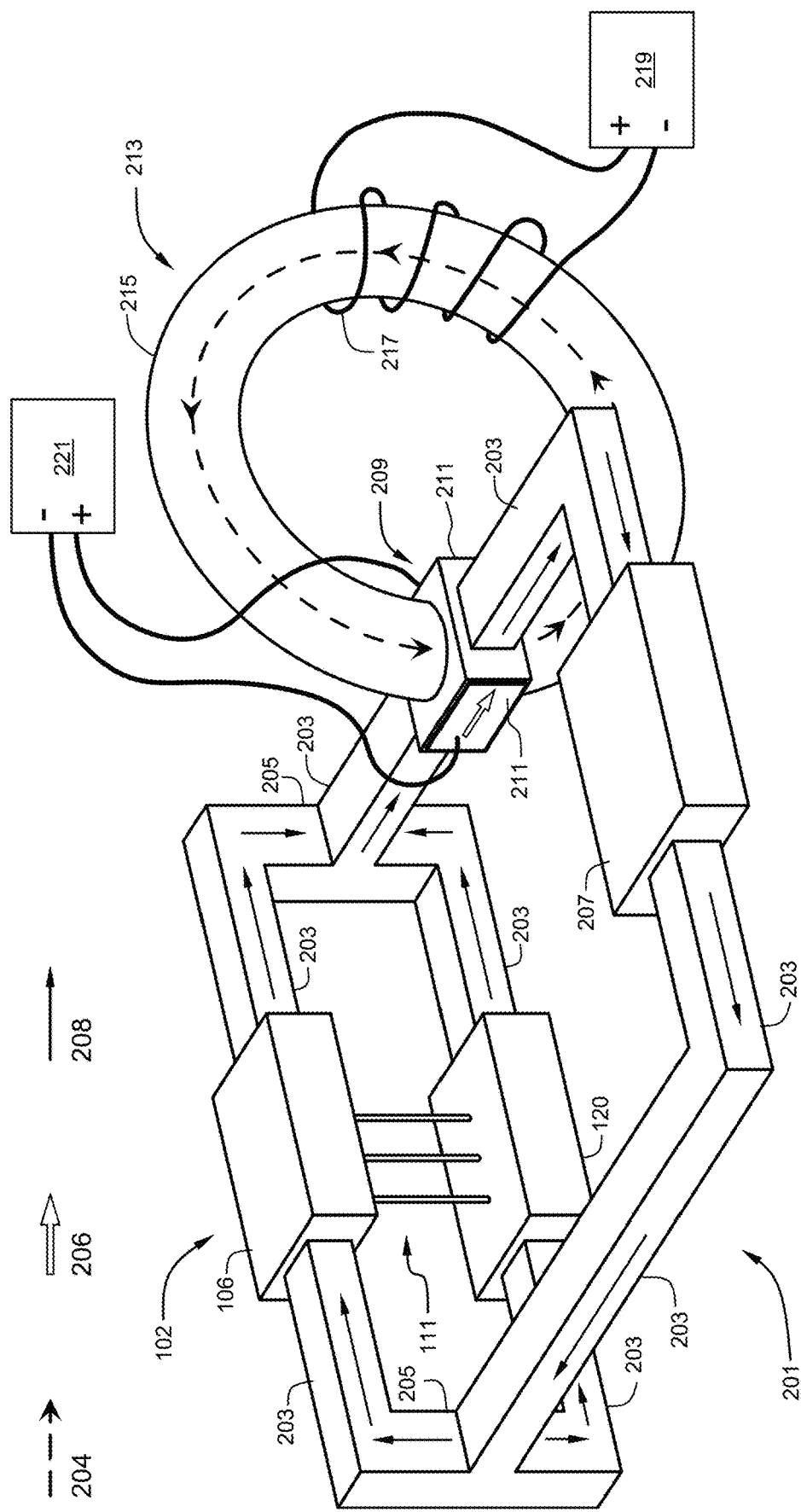
FIG. 2 illustrates an EDU integrated cooling apparatus in an electrified vehicle, in accordance with one or more embodiments.

With additional reference to FIG. 2, an embodiment of an EDU integrated cooling apparatus 201 in the electrified vehicle 100 of FIG. 1 is illustrated. The cooling apparatus 201 is effective to circulate a thermally conductive working fluid through a closed circulation path for absorbing heat from EDU components and systems and redistributing the heat within the electrified vehicle 101 or dissipating the heat to the atmosphere. The closed circulation path may include thermally conductive or insulative conduits 203, manifolds 205 for splitting and combing flows, flow control valves and other fluid management apparatus such as accumulators, reservoirs, sumps, etc. (not illustrated). In an embodiment, the closed circulation path may absorb heat from the TPIM 106 of the EDU 102. In an embodiment, the closed circulation path may absorb heat from the motor 120 of the EDU 102. In an embodiment as illustrated in FIG. 2, the TPIM 106 and the motor 120 each have a respective inlet and outlet serviced by respective working fluid flows 208 in parallel. It is understood that the TPIM 106 and the motor 120 may be serially coupled and serviced by a single fluid flow 208. The TPIM 106 and the motor 120 are generally considered to be heat sources which, during operation, may produce waste heat that is desirably carried away from the TPIM 106 and the motor 120 for redistribution within the electrified vehicle 101 or dissipated to the atmosphere. Other heat sources, for example the RESS 104 may be similarly included for servicing by the closed circulation path to thermally manage the RESS 104.

In an embodiment, the closed circulation path through the TPIM 106 may include a cold plate 115 (FIG. 1) contributing a portion of the closed circulation path for the working fluid and thermally conductive mounting provisions for the power inverter 110 (e.g., IGBTs or other power switches) effective for absorbing heat from the power inverter 110 of the TPIM 106. The cold plate 115 may also be effective to conduct heat away from control electronics such as the motor controller 105 of the TPIM 106 or a separate cold plate may be engaged for that purpose and included within the closed circulation path for the working fluid. In an embodiment, the motor 120 may include a fluid inlet at the non-drive end of the rotor shaft 125 for flow through a central bore channel, distribution through cooling channels within the rotor structure and return to a sump within the EDU housing 116. In an embodiment, the EDU housing 116 or motor housing (not illustrated) in lesser integrations may include internal cooling passages 117 or an external cooling jacket 118 (FIG. 1) contributing a portion of the closed circulation path for the working fluid effective for absorbing heat from the motor 120.

The cooling apparatus 201 may include a heat dissipation device 207. In an embodiment, the heat dissipation device may include a radiator effective to dissipate heat to the atmosphere external to the electrified vehicle. In an embodiment, the heat dissipation device may include a heater core that may be part of an interior cabin heating ventilation and air condition (HVAC) system for use in cabin climate and passenger comfort controls, window defrosting, seat ventilation heating, etc. In an embodiment, the heat dissipation device 207 may include a heat exchanger effective to remove heat from the working fluid in the closed circulation path for redistribution to another electrified vehicle system, for example to a heating/cooling plate in the RESS 104 effective to provide heat into the RESS 104. In an embodiment, a heating/cooling plate associated with the RESS 104 may alternately be used for absorbing excess heat from the RESS for exchange into the working fluid in the closed circulation path of the cooling apparatus 201 for removal from the electrified vehicle or redistribution therein.

In an embodiment, the cooling apparatus 201 includes one or more magnetohydrodynamic (MHD) pumps 209 in-line with at least one conduit 203 enclosing a working fluid. A MHD pump is a device which exerts a force upon the enclosed working fluid without the use of moving parts. MHD pump working fluid is electrically conductive and the MHD pump may pass a direct current through the working fluid orthogonal to the desired direction of working fluid flow. Simultaneous application of a magnetic field orthogonal to the direct current through the working fluid and to the desired direction of working fluid flow results in Lorentz forces upon the fluid and movement of the fluid in the desired direction. The working fluid in addition to being thermally conductive to achieve effective heat transfer is electrically conductive. The MEM pump 209 may include a magnetic field 204 passing substantially orthogonally to the desired fluid flow 208 pumping direction. The MEM pump may also include a current flowing through the working fluid substantially orthogonally to both the magnetic field and the desired fluid flow 208. A force (i.e., Lorentz force 206) is applied to the working fluid with such and orthogonal arrangement between the magnetic field and the current through the working fluid thereby moving the working fluid in the desired direction. It is understood that reversal of either the current through the working fluid or the magnetic field 204 will reverse the Lorentz force 206 and hence reverse the fluid flow 208. Thus, the MHD pump may include generally planar electrodes 211 in contact with the working fluid on opposite sides of the MHD pump 209 parallel to the desired fluid flow 208 pumping direction. A first DC power source 221 couples to the electrodes 211 to provide current through the working fluid therebetween. In an embodiment, the magnetic field 204 of the MHD pump 209 may be provided by an inductor 213. The inductor 213 may be an open air core inductor including only a coil 217 or may include an iron core 215. An iron core 215 is understood to be advantageous for increased inductance over an open air core. The iron core 215 may be a "C" core being continuous but for an air gap within which the MHD pump 209 may reside thereby advantageously concentrating the magnetic field 204 for increased flux density through the working fluid and reduced flux leakage. A second DC power source 219 couples to the coil 217 to provide current therethrough for inducing the magnetic field 204.

Figure 3:
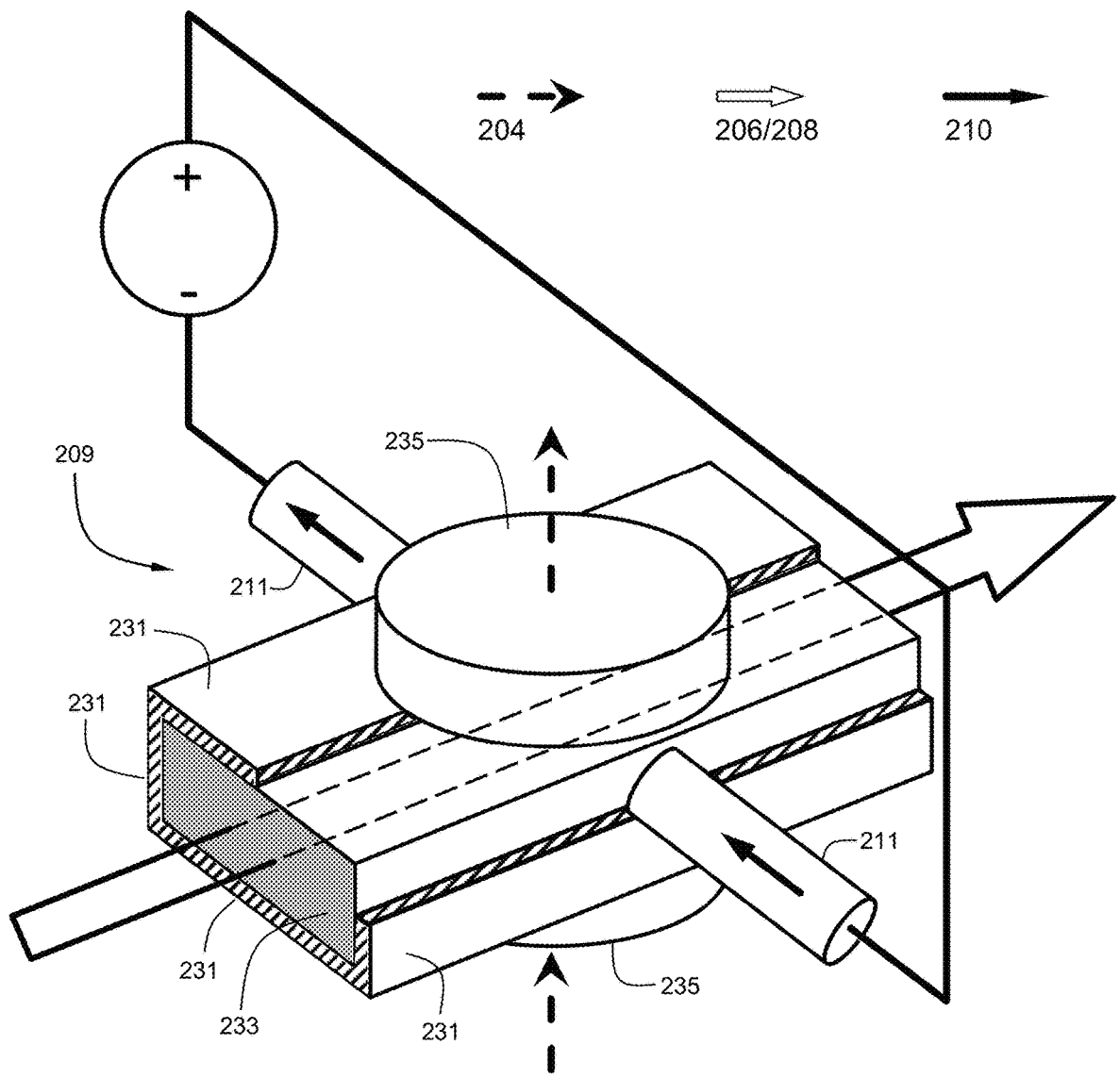
FIG. 3 illustrates a magnetohydrodynamic pump, in accordance with one or more embodiments.

In FIG. 3, an embodiment of a MHD pump 209 is illustrated showing the orthogonal arrangement among the magnetic field 204, the current 210 through the working fluid and the Lorentz force 206/fluid flow 208. The MHD pump 209 may include working fluid containment walls 231 circumscribing the working fluid 233. Opposing electrodes 211 are in contact with the working fluid at opposite sides of the MHD pump. The magnetic field 204 through the working fluid is orthogonal to the current through the working fluid 233. In the illustrated embodiment, the magnetic field 204 is the product of permanent magnets 235 on opposing sided of the MHD pump 209. The current through the working fluid 233 and the magnetic field 204 through the working fluid 233 thus applies the Lorentz force 206 to the working fluid 233 thereby moving the working fluid in the desired direction. A MHD pump may have inherent efficiency advantages over traditional electrical pumps, for example. Motor electrical and pump section mechanical losses are eliminated since those components do not exist in a MHD pump. Pump durability and longevity of MHD pumps are also improved over traditional electrical pumps through eliminated electrical and mechanical components. Complexity of a MHD pump compared to alternatives is also reduced in the general areas of electrical power supply requirements, packaging and housing, sealing and fluid isolation, moisture control, flow interface and control, among others. Advantageously, MHD pumps are effectively silent, have a high degree of system integration, and may be utilized within wider bands of temperature limits than traditional electrical pumps.

In an embodiment, the working fluid may be any application suitable conductive fluid. In one embodiment, the working fluid may be a saline solution of water. In another embodiment, room-temperature (or higher) molten salts may serve as the working fluid depending upon the application temperature requirements. In another embodiment, conductive nanofluids such as propylene glycol-based ZnO nanofluids. In another embodiment, liquid metals may serve as the working fluid. gallium or gallium alloys such as gallium-tin alloys and gallium-indium-tin alloys which are liquid at relatively low temperatures may serve as the working fluid.

Figure 4:
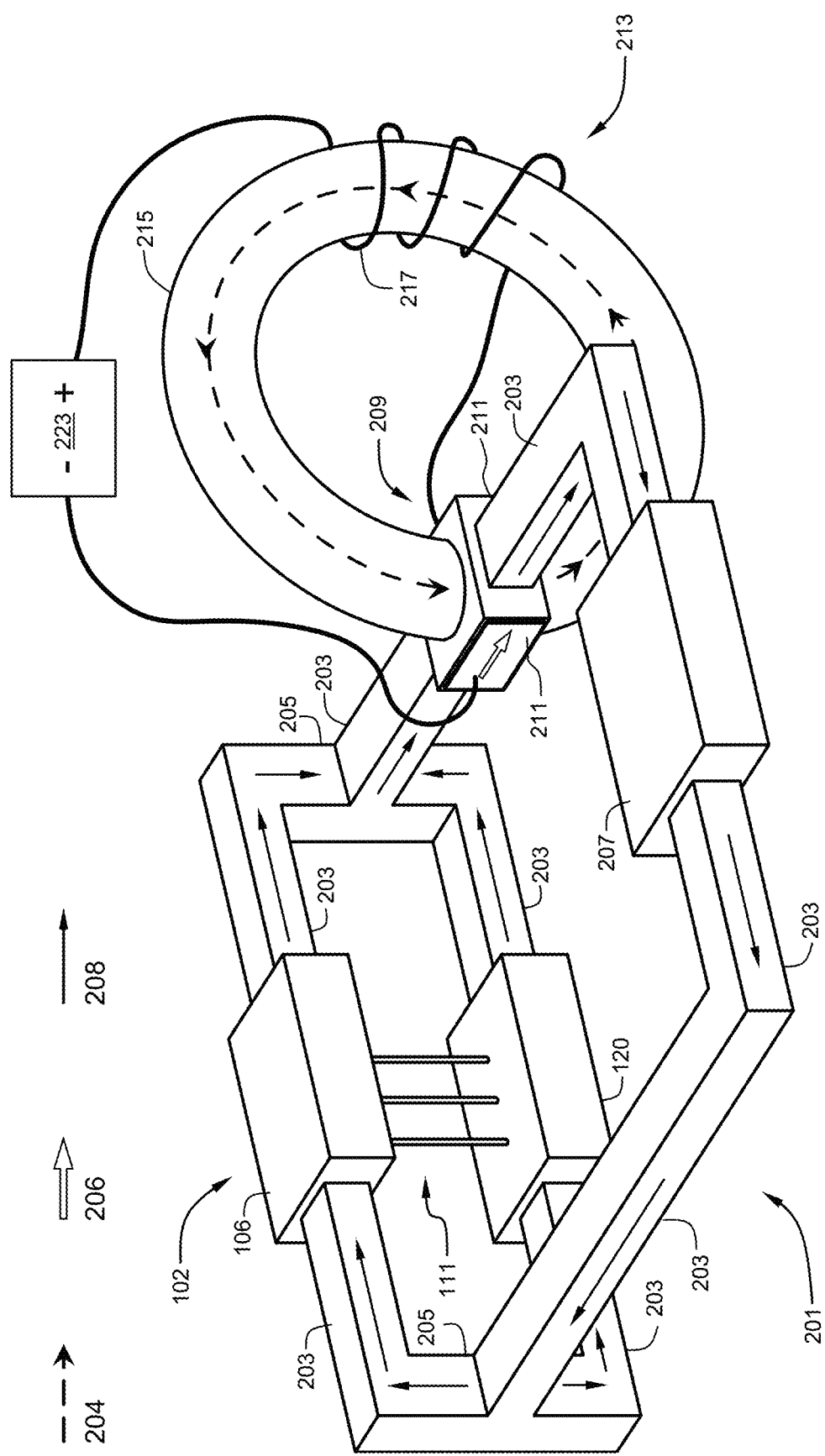
FIG. 4 illustrates an EDU integrated cooling apparatus in an electrified vehicle, in accordance with one or more embodiments.

FIG. 4 illustrates an embodiment of an EDU integrated cooling apparatus 201 in the electrified vehicle 100 of FIG. 1. Parts and features of the embodiment of FIG. 4 sharing reference numerals with FIGS. 1-3 correspond to parts and features of FIGS. 1-3 as described herein and thus may not be separately described. In the embodiment of FIG. 4, a DC power source 223 couples to the electrodes 211 and to the coil 217 to provide a common current through the working fluid in the MHD 209 and the coil 217 of the inductor 213.

Figure 5:
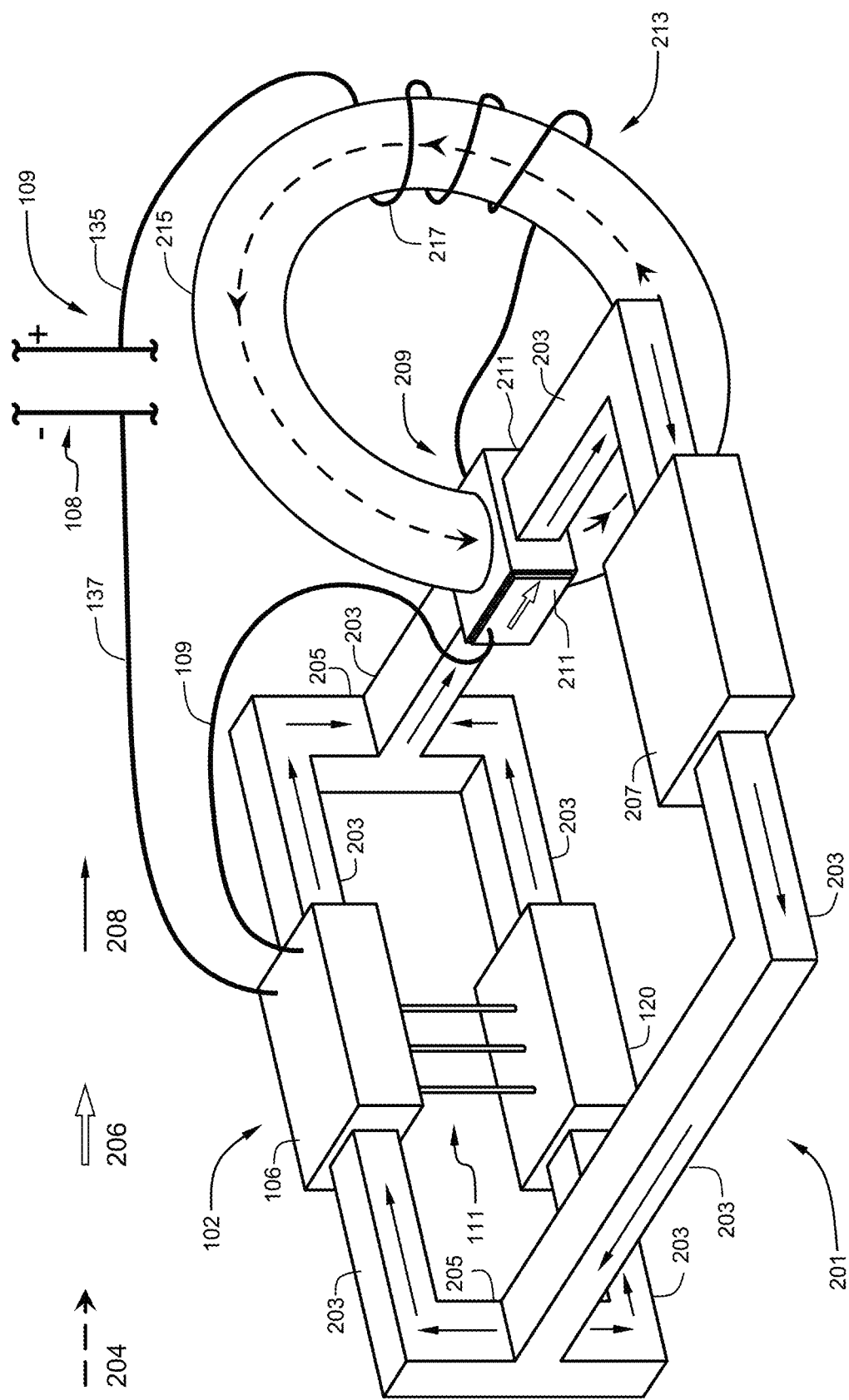
FIG. 5 illustrates an EDU integrated cooling apparatus in an electrified vehicle, in accordance with one or more embodiments.

FIG. 5 illustrates an embodiment of an EDU integrated cooling apparatus 201 in the electrified vehicle 100 of FIG. 1. Parts and features of the embodiment of FIG. 5 sharing reference numerals with FIGS. 1-4 correspond to parts and features of FIGS. 1-4 as described herein and thus may not be separately described. In the embodiment of FIG. 5, a DC power source couples to the electrodes 211 and to the coil 217 to provide a common current through the working fluid in the MHD 209 and the coil 217. The DC power source in the embodiment of FIG. 5 may include the HV DC bus 108 via the DC link 109 including the positive DC rail 135 and a negative DC rail 137. Advantageously, the inductor 213 may be the DC link choke 113 in-line with the positive DC rail 135 for high frequency noise suppression and DC current stabilization as shown in FIG. 1 and described herein. In such an embodiment, increasing DC currents through the power inverter 110 of the TPIM 106 may result in an increasing magnetic field 204 and current through the working fluid resulting in an increasing Lorentz force 206 and working fluid flow velocity. Thus, such an embodiment may advantageously self-regulate cooling of the TPIM 106 and motor 120 of the EDU 102 since higher system currents generally correspond to higher system thermal loads. The inductor 213 may similarly be the DC link choke 119 in-line with the negative DC rail 137.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An electrified vehicle, comprising:
   an electric drive unit including a power inverter and a motor;
   a closed circulation path containing an electrically conductive working fluid in thermal communication with at least one of the power inverter and the motor;
   a magnetohydrodynamic pump containing the working fluid and effective to circulate the working fluid through the closed circulation path; and
   a first direct current (DC) power supply providing a first current through the working fluid within the magnetohydrodynamic pump and a second DC power supply providing a second current through a coil of an inductor.

2. The electrified vehicle of claim 1, wherein the closed circulation path comprises a heat dissipation device for dissipating heat from the working fluid.

3. The electrified vehicle of claim 1, wherein the closed circulation path comprises a cold plate in thermal communication with the power inverter.

4. The electrified vehicle of claim 1, wherein the closed circulation path comprises a cooling passage within a housing for the electric drive unit.

5. The electrified vehicle of claim 1, wherein the closed circulation path comprises a cooling jacket for the electric drive unit.

6. The electrified vehicle of claim 2, wherein the magnetohydrodynamic pump comprises the inductor, and wherein the inductor provides a magnetic field through the working fluid.

7. The electrified vehicle of claim 2, wherein the magnetohydrodynamic pump comprises permanent magnets providing a magnetic field through the working fluid.

8. The electrified vehicle of claim 6, wherein the closed circulation path comprises a heat dissipation device for dissipating heat from the working fluid, a cold plate in thermal communication with the power inverter, a cooling passage within a housing for the electric drive unit, and a cooling jacket for the electric drive unit.

9. The electrified vehicle of claim 6, wherein the inductor comprises a coil and an iron core.

10. The electrified vehicle of claim 6, wherein the inductor is in-line with a DC link to the power inverter.

11. The electrified vehicle of claim 6, further comprising a DC power supply providing a common current through the working fluid within the magnetohydrodynamic pump and through a coil of the inductor.

12. The electrified vehicle of claim 11, wherein the DC power source comprises a high voltage DC bus coupled to the power inverter through a DC link.

13. The electrified vehicle of claim 12, wherein the high voltage DC bus is coupled to the power inverter through a DC link including a positive DC rail and wherein the inductor is in-line with the positive DC rail.

14. The electrified vehicle of claim 1, wherein the working fluid comprises one of a saline solution of water, a molten salt, a conductive nanofluid, and a liquid metal.

15. An electrified vehicle, comprising:
   an electric drive unit including a power inverter and a motor, the power inverter coupled to a direct current (DC) power source through a DC link including an inductor in-line with the DC link;
   a closed circulation path including a cold plate in thermal communication with the power inverter and containing an electrically conductive working fluid in thermal communication with the power inverter and including a heat dissipation device for dissipating heat from the working fluid; and
   a magnetohydrodynamic pump containing the working fluid and effective to circulate the working fluid through the closed circulation path, wherein the DC link provides a current through the inductor, the inductor provides a magnetic field to the magnetohydrodynamic pump and the current through the inductor is provided through the electrically conductive working fluid at the magnetohydrodynamic pump.

16. The electrified vehicle of claim 15, wherein the closed circulation path further includes cooling channels within a rotor structure of the motor.

17. The electrified vehicle of claim 15 wherein the working fluid comprises one of a saline solution of water, a molten salt, a conductive nanofluid, and a liquid metal.

18. A cooling system for an electrified vehicle, comprising:
   a power inverter coupled to a direct current (DC) power source through a DC link including an inductor in-line with the DC link for providing a DC current to the power inverter; and
   a magnetohydrodynamic pump circulating an electrically conductive working fluid through a closed circulation path, wherein the inductor in-line with the DC link provides a magnetic field to the magnetohydrodynamic pump and stabilizes the DC current.

19. The cooling system for the electrified vehicle of claim 18, wherein the DC link provides a current through the electrically conductive working fluid at the magnetohydrodynamic pump.

20. The cooling system for the electrified vehicle of claim 19, wherein the current through the electrically conductive working fluid comprises a common current through the inductor in-line with the DC link.

* * * * *